Nov. 27, 1923.

L. R. BEHNKE

PISTON RING

Filed Aug. 9, 1922

1,475,783

Inventor
Leo R. Behnke.

By *[signature]*

Attorney

Patented Nov. 27, 1923.

1,475,783

UNITED STATES PATENT OFFICE.

LEO R. BEHNKE, OF CHILDRESS, TEXAS.

PISTON RING.

Application filed August 9, 1922. Serial No. 580,771.

*To all whom it may concern:*

Be it known that I, LEO R. BEHNKE, a citizen of the United States, residing at Childress, in the county of Childress and State of Texas, have invented certain new and useful Improvements in Piston Rings, of which the following is a specification, reference being had to the accompanying drawings, forming a part thereof.

My invention relates to piston rings such as are commonly carried in annular grooves, formed to receive them in the pistons of internal combustion engines, for the purpose of preventing leakage of gases between the piston and cylinder. Such piston rings are usually formed by cutting off a ring from a hollow cylinder, severing it at one point and so forming the ends that one will slide slightly past the other when the ring is compressed. My invention has for its object to provide an interlocking joint for the ends of the ring which will be gas tight and in which the ends of the ring forming the joint may be readily formed to the necessary shapes and at slight expense.

With these objects and other objects hereinafter explained in view my invention consists in the construction and combination of elements hereinafter described and claimed.

Referring to the drawing.

Figure 1:
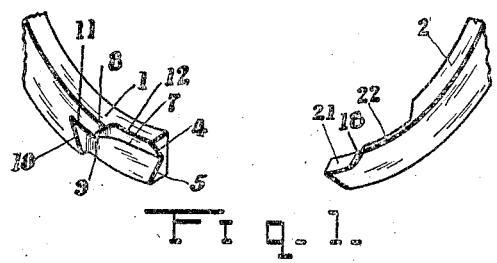
Figure 1 is a perspective view of the joint portions of a piston ring embodying my invention, the ends being shown widely separated for the purpose of showing the construction more clearly.
Figure 3:
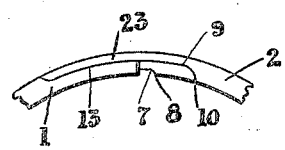
Figure 3 is a bottom plan view of the joint portion of the ring shown in Figure 2.
Figure 2:
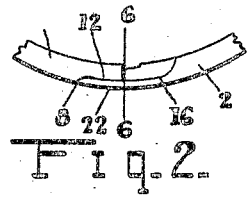
Figure 2 is a top plan view of the joint portions of the ring shown in Figure 1, the ends being shown pressed together.

The main portion of the ring shown in the drawings is of usual construction. 1 indicates one of the ends, which for convenience may be termed the mortise or receiving end, and 2 indicates the other end which may be termed the tenon or entrant end.

Figure 6:
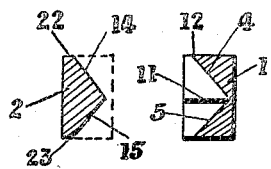
Figure 6 is a cross sectional view, on an enlarged scale, on line 6—6 of Figure 2, the end members being separated and, Figure 7 is a similar cross sectional view on line 7—7 of Figure 4.

The mortised or receiving end 1 is formed by milling or otherwise cutting away the outer face of the end so as to form two surfaces 4 and 5 oblique to each other and oblique to the faces of the ring. From the extreme end of this mortised end 1 for a short distance the surfaces 4 and 5 extend in lines longitudinally parallel with the front and back faces of the ring as shown in Figure 6, this parallelism terminating at 7. From this point the surface 4 gradually approaches the front face of the ring so that this surface terminates on a line 8 which is at an oblique angle to the plane of the ring approximating 45 degrees. The surface 5 is extended a greater distance from the extreme end of the ring than surface 4 but from a point 9 it begins to approach the front face of the ring and it terminates on a line 10 which like the line 8 is oblique to the plane of the ring but is nearly at right angles to line 8. By thus prolonging the surface 5 beyond the line 8 a surface 11 is formed parallel with the plane of the ring. These surfaces 4 and 5 may each be readily cut by a single operation of a milling cutter of appropriate shape. The surfaces 4 and 5 are formed at such distance from the front face of the ring that the surface 4 cuts the top surface of the ring on a line 12 a substantial distance back from the front face and the surface 5 cuts the bottom surface of the ring on a line 13 a substantial distance back from the front face. The surfaces 4 and 5 thus form an open mortise or recess of V shape in cross section.

The tenon or entrant end 2 is so formed as to fit the mortise or recess in the end 1, the tenon being of considerably greater length than the length of the mortise or recess in the other end. The tenon is formed by cutting away the back face of the ring on surfaces 14 and 15 extending from a line 16 toward the extreme end of the tenon member, the surface 14 curving outward from a point 17 toward the front face of the ring so that the portion of the tenon defined by this surface terminates on line 18. The surface 15 is considerably longer than surface 14 and terminates on line 20. Between line 18 and line 20 the portion of the tenon defined by line 15 has a face 21 in the plane of the ring.

The surfaces 14 and 15 are adapted to be each cut by a single operation of a milling tool of appropriate shape.

The surface 14 is so formed relative to the front face of the ring that a narrow ledge strip 22 is left along the front edge of the top surface of the ring and the surface 15 is so formed as to leave a narrow face 15 is so formed as to leave a narrow ledge strip 23 along the front edge of the bottom surface of the ring.

The angles at which the surfaces 14 and 15 are cut correspond to the angles of the surfaces 4 and 5 so that when the two ends of the ring are pressed together the surfaces 4 and 14 fit together, and the surfaces 5 and 15 fit together and the surface 21 fits against the surface 11. The ledge strip 22 fills the space between line 12 and the line of the front face of the ring and the ledge strip 23 fills the space between line 13 and the line of the front face of the ring.

Figure 4:
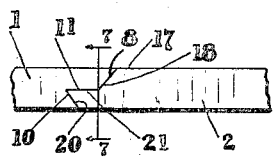
Figure 4 is a side view of the joint portion of the ring shown in Figures 2 and 3.
Figure 7:
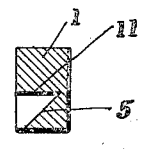
Figure 5:
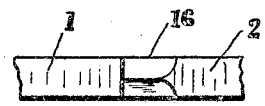
Figure 5 is a rear view of the joint portion of the ring as shown in Figures 2, 3, and 4.

When the ends of the piston ring are forced together, as shown in Figure 4, the lines 10 and 20, and the lines 8 and 18 are in contact as well as the surfaces 11 and 21 effectively preventing leakage along these lines and the edges of the strips 22 and 23 being in contact with the edges of the recesses 12 and 13 respectively prevent leakage at the top and bottom edges of the front face of the ring.

When the ends of the ring are separated by their springing away from each other, leakage is effectively prevented by the contact of surfaces 4 and 14, and 5 and 15, the contact of the edges of strips 22 and 23 with the edges of recesses 12 and 13, respectively, preventing leakage at the top and bottom edges of the ring. Gas in order to leak past the ring in a direction from the upper to the lower edge of the ring must enter the space between the terminal lines 8 and 18, pass between surfaces 4 and 14 and downward in rear of 15 and between strip 23 and recess 13 and between the edge of strip 23 and the groove in which the ring is carried. The gas in order to leak past the ring must follow a tortuous course and its passage is thus resisted to such an extent that leakage is practically completely prevented. In order to leak in the opposite direction the gas entering the space between the end lines 10 and 20 must pass between the surfaces 5 and 15 into the space in rear of 14 and between strip 22 and recess 12 and between the edge of strip 22 and the groove in which the ring is carried.

By forming the faces 4 and 5 and 14 and 15 at the angle shown the extent of the contacting surfaces is made as great as possible and consequently their resistance to leakage is made as great as possible.

It will, of course be understood that the rings may be made of any diameter, width or thickness desired.

Having thus described my invention what I claim is:

1. In a piston ring a mortised end having its upper portion cut away from its front face so as to form a relatively short surface oblique to the front face of the ring extending rearward and downward, and having its lower portion cut away from its front face so as to form a relatively long surface oblique to the front face of the ring extending upward and rearward, said upper and lower oblique surfaces meeting on a line parallel with the upper and lower edges of the ring so as to form a V shaped recess, each of said oblique surfaces curving towards the front face of the ring and terminating on a line oblique to the plane of the ring, the line terminating the upper oblique surface being oblique to the line terminating the lower oblique surface, and a tenon member adapted to fit the recess in the mortised member.

2. In a piston ring a mortised end having its upper portion cut away from its front face so as to form a relatively short surface oblique to the front face of the ring extending rearward and downward, and having its lower portion cut away from its front face so as to form a relatively long surface oblique to the front face of the ring extending upward and rearward, said upper and lower oblique surfaces meeting on a line parallel with the upper and lower edges of the ring so as to form a V shaped recess, each of said oblique surfaces curving towards the front face of the ring and terminating on a line oblique to the plane of the ring, the line terminating the upper oblique surface being oblique to the line terminating the lower oblique surface and a plane surface parallel with the plane of the ring and in line with the meeting line of the upper and lower oblique surfaces, and a tenon member adapted to fit the recess in the mortised member.

3. In a piston ring a mortised end having its upper portion cut away from its front face so as to form a relatively short surface oblique to the front face of the ring extending rearward and downward, and having its lower portion cut away from its front face so as to form a relatively long surface oblique to the front face of the ring extending upward and rearward, said upper and lower oblique surfaces meeting on a line parallel with the upper and lower edges of the ring so as to form a V shaped recess, each of said oblique surfaces curving towards the front face of the ring and terminating on a line oblique to the plane of the ring, the line terminating the upper oblique surface being oblique to the line terminating the lower oblique surface and a tenon member adapted to fit the recess in the mortised member having the ends of its upper and lower portions terminating on curved surfaces adapted to fit the curved surfaces at the ends of the oblique surfaces of the mortised member.

In testimony whereof I hereunto affix my signature.

LEO R. BEHNKE.